March 26, 1963 J. M. BOSLAND 3,082,623
MARINE SPEEDOMETER
Filed July 11, 1961
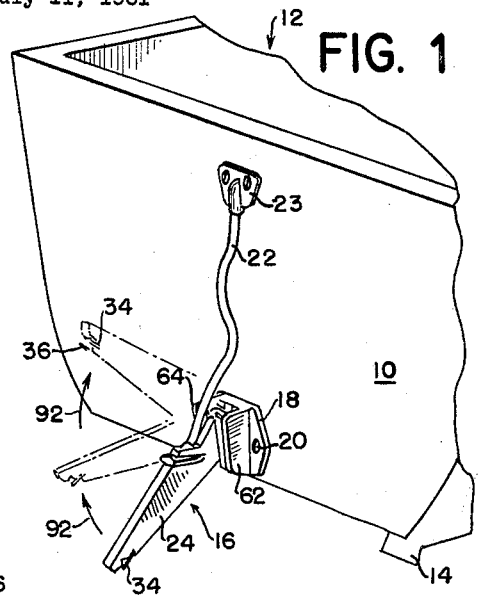
FIG. 1
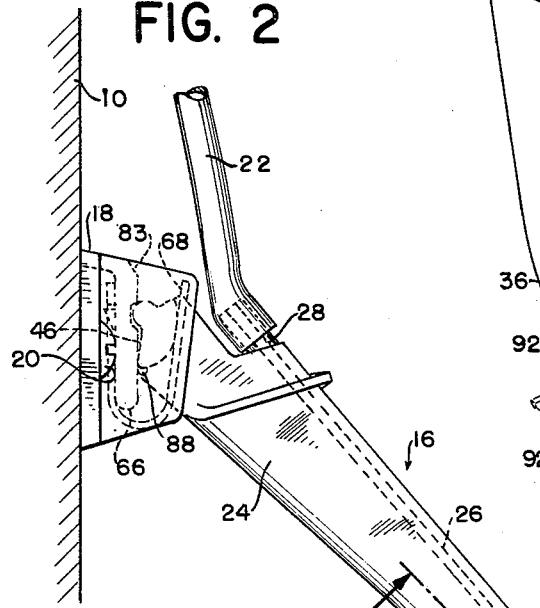
FIG. 2
FIG. 3
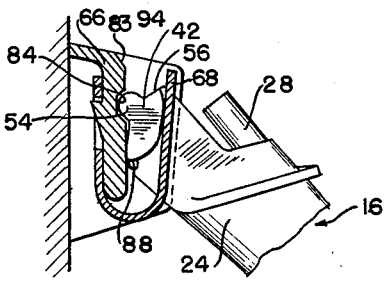
FIG. 4
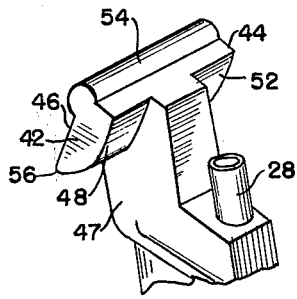
FIG. 5
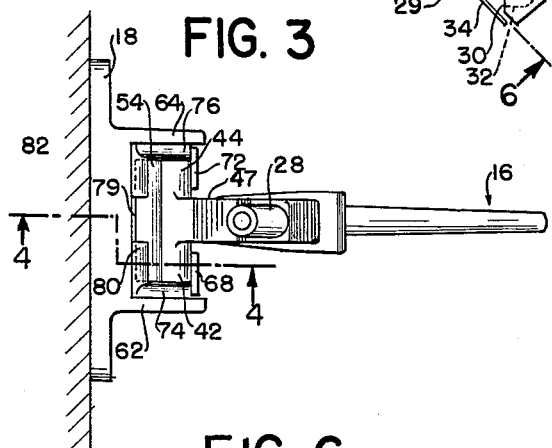
FIG. 6
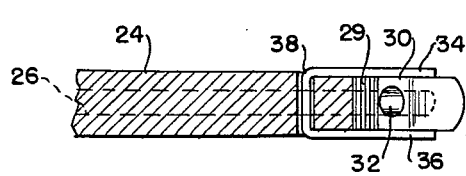
INVENTOR.
JAMES M. BOSLAND
BY Darby & Darby
ATTORNEYS United States Patent Office 3,082,623
Patented Mar. 26, 1963

3,082,623
MARINE SPEEDOMETER
James M. Bosland, Packanack Lake, N.J., assignor to Ketcham & McDougall, Inc., Roseland, N.J., a corporation of New Jersey
Filed July 11, 1961, Ser. No. 123,973
7 Claims. (Cl. 73—182)

This invention relates to marine speedometers and more particularly to the impact Pitot tube of a marine speedometer actuated by the water pressure.

The measurement of the speed of a boat is desirable and often necessary to the boatman. Estimating the speed of a boat over water is deceptive even by experienced boatmen and most boatmen tend to over-estimate it. Knowledge of a boat speed is important to navigation and piloting and further it aids in fuel conservation, since the boat speed can be maintained at the most efficient cruising speed.

Also, ski-jumping and slalom skiing call for carefully regulated water speed.

A marine or water speedometer provides speed over the water surface rather than over the bottom despite changes in hull or engine condition. A common form of water speedometer in use today is the water pressure actuated Pitot-tube type of pressure guage. A flexible or metal tube normally connects this pressure gauge with a water intake or impact tube which projects beneath the boat. This type of water speedometer is pressure-actuated and works on the impact pressure of the water caused by the forward speed of the boat over the water surface. Heretofore, in designing and maintaining an accurate water speedometer of this type, a difficulty often encountered was the damage to the water intake tube by impact with floating debris such as driftwood, floats, under-water obstructions, docks or stones. The rigidly mounted water intake tube hitting a float or debris was often deformed and bent out of alignment if not sheared off, causing damage, loss or at least erroneous readings.

A further difficulty often encountered was the clogging of the hole in the impact or Pitot tube by seaweed, paper, leaves or other type of resilient debris often found in water.

In an outboard motor type of boat the preferred location for the water intake tube or impact tube is on the transom of the boat, preferably well to one side of the keel, so as to be away from the turbulence caused by the keel's passage through the water. If the impact tube is mounted forward on a boat using an outboard motor, in which position the tube is often placed on an inboard motor type of boat, the tube would often be out of the water during the normal operation of the boat, resulting in inoperativeness of the speedometer or else requiring an unduly long tube, which would then vary the static pressure on the tube in proportion to the depth to which it is immersed in the water, so as to cause inaccuracies especially when the boat is run at low speeds. Advantageously the impact tube is kept to a minimum size and silhouette so as to offer the least possible resistance and drag through the water.

A feature of the present invention is to provide for a water speedometer having a Pitot tube or impact tube readily removable at will for easy inspection, also one having a position for beaching or trailing the boat while being firmly retained during normal operation, an impact tube which correctly positions its inlet opening at the proper depth of water when mounted on an outboard motor boat, which is not damaged by blows occasioned by striking obstructions in the water and which automatically returns to its operative position, which is easily removed from the water, and which can be returned to its operative position easily.

A further object is to provide an impact tube that will slip out of its mounting clip when subjected to abnormal stresses such as might occur vertically when a boat is moored in too shallow water, or will slip out of its mounting when struck from the rear as might occur when launching a boat stern first in shallow water.

A further object of the present invention is to provide an impact tube which will not be fouled by seaweed or paper or the like and which prevents seaweed from clogging or blocking the openings of the impact tube.

The impact tube of the present invention is easily installed in proper working position by unskilled, and non-technical boat operators. It is resistant to the corrosive effect of salt water and the effect of sunlight, is of minimum size and silhouette, which is simple and economical to manufacture, and is long-lasting and durable in use.

These and other objects and advantages of the present invention will be apparent from the following description of the preferred embodiment thereof taken with the accompanying drawing, wherein:

FIGURE 1 shows an impact tube and connecting tube for a marine pressure type gauge speedometer in accordance with the present invention mounted to the transom of a boat in normal operative position and showing other positions of the tube in phantom;

FIGURE 2 is a side elevational view of the impact tube mounted on a boat;

FIGURE 3 is a plan view of the impact tube mounted on a boat;

FIGURE 4 is a side elevational view, partly in section, taken along line 4—4 of FIGURE 3;

FIGURE 5 is a perspective view of the upper portion of the impact tube; and

FIGURE 6 is a bottom view taken along line 6—6 of FIGURE 2.

Referring now to the drawings, there is shown a boat 12, broken away, having a transom 10 and a keel 14. Mounted on transom 10 to one side of keel 14, so as to be free from turbulence caused by the keel moving in water, is an impact tube 16. Impact tube 16 is removably mounted to a bracket 18 which is secured to transom 10 in some convenient manner, such as by screws or bolts indicated generally at 20. Impact tube 16 is connected to a pressure gauge, not shown, by a flexible connecting tube 22 which is shown supported on transom 10 by a mounting 23.

Impact tube 16 is preferably made of a semi-rigid material, such as a tough plastic such as nylon, which is resistant to the corrosive effect of salt water and atmospheric conditions. Impact tube 16 has an elongated body portion 24 having a longitudinal bore 26 therein terminatiang adjacent the lower end.

For ease in manufacture bore 26 may pass through body 24 and open through the upper and lower ends. However, for consistent accurate operation bore 26 should have only one path communicating with connecting tube 22 and hence the opening at the lower end is closed in the same manner, such as a plug or insert. Integrally mounted on the upper portion of body 24 is a sleeve 28 having an aperture therein communicating with bore 26. One end of connecting tube 22 is frictionally mounted on sleeve 28, although clamping or other convenient manner of securing tube 22 to body 24 may be used. The lower end of body 21 has a right angle cutout with one surface 29 being substantially parallel to the movement of boat 12 and the other surface 30 being substantially transverse to the direction of movement of boat 12. In the lower end of body 24 and substantially perpendicular to surface 30 is a bore 32 communicating with bore 26. Surface 30 faces transom 10, which in the drawings is the forward direction of movement of boat 12, so that the opening of bore 32 receives the impact pressure of the water resulting from the forward speed of the boat. This pressure is transmitted through bore 32 via bore 26 through the bore in tube 22 to the pressure gauge, which is not shown and which is conveniently mounted in the boat. Straddling the opening of bore 32 on opposite sides of body 24 are a pair of rods 34 and 36. Rods 34 and 36 are advantageously the upstanding arms of a U-shaped member indicated at 38 in FIGURE 6, which base is fixedly mounted in the lower end of body portion 24. However, rods 34 and 36 may be mounted in any convenient manner. Rods 34 and 36 do not obstruct the opening of bore 32 and preferably are made of a stainless steal. Rods 34 and 36 prevent fouling of opening of bore 32 by seaweed or paper and the like by preventing this material from clogging or blocking the opening.

At the upper end 47 of the body 24 are transversely directed coplanar arms 42 and 44. The surfaces of arms 42 and 44 facing away from body 24 form a smooth uniform portion indicated at 46 in FIGURES 2 and 5. The surfaces of arms 42 and 44 facing body 24 are designated generally 48 and 52 respectively and are substantially parallel to surface 46, and have their lowermost edges tapering towards surface 46. Surfaces 46, 48 and 52 are bearing surfaces and form an acute angle with the longitudinal axis of body 24. Abutting the upper portion of surface 46 and extending along arms 42 and 44 is a projecting annular surface 54. Tapering upwardly from annular surface 54 and intersecting surfaces 48 and 52 is a surface 56 for forming a stop.

Arms 42 and 44 are removably held in proper position in bracket 18 for correctly positioning opening 32 in the bottom of body portion 24 in the water. Bracket 18 has a pair of outwardly extending, spaced apart arms 62 and 64. Arms 62 and 64 are spaced apart a distance slightly greater than the length of arms 42 and 44 on tube 16. Arms 62 and 64 are undercut along their inner longitudinal edge for forming a step 74 and 76, respectively. Between arms 62 and 64 is a base wall 66 spaced from transom 10. Fixedly attached to the surface of wall 66 facing transom 10 is one leg of each of a pair of U-shaped flexible clamps 68 and 72. Clamps 68 and 72 abut respective arms 62 and 64 and the other leg or outer leg of clamps 68 and 72 rest on steps 74 and 76, respectively. While the outer legs of clamps 68 and 72 are spaced apart a distance greater than the thickness of the upper poriton of body 24, the inner legs of clamps 68 and 72 may be conveniently joined. The clamps may be made from a single piece of flexible material with two extending fingers bent to form the clamp. Also, clamping arms may be conveniently mounted in other manners on bracket 18. Wall 66 of bracket 18 has a groove 79 formed therein which is substantially parallel to arms 62 and 64 and centrally disposed therebetween. Groove 79 forms a pair of downwardly tapering surfaces 80 and 82 on opposite sides thereof. Surfaces 80 and 82 have a transversely disposed aligned groove therein 84, corresponding in size to annular surface 54 on arms 42 and 44. The distance between the upper portion of tapered surfaces 80 and 82 and the inner surfaces of the legs of clamps 68 and 72 in their rest position is less than the width of arms 42 and 44 measured along a line intersecting annular surface 54. Spaced below groove 84 on surfaces 80 and 82 a distance corresponding to the depth of surface 46 on arms 42 and 44 are a pair of projections or stops 88.

To use impact tube 16, bracket 18 is fixedly mounted to the outer surface of transom 10 spaced preferably to one side of keel 14 and adjacent the water line of boat 12. Transverse arms 42 and 44 of impact tube 16 are positioned between bracket arms 62 and 64 with annular surface 56 and smooth surface 46 facing base 66, and with the upper portion of body 24 between clamps 68 and 72. Surfaces 48 and 52 of arms 42 and 44 abut the inner surfaces of clamps 68 and 72. Impact tube 16 is forced downwardly so that annular surface 54 of tube 16 slides along tapered surfaces 80 and 82 of bracket 18. Since the width of arms 42 and 44 including annular projection 54 is greater than the distance between surfaces 80 and 82 and respective clamps 68 and 72, clamps 68 and 72 are forced outwardly by surfaces 48 and 52 away from steps 74 and 76, respectively. Urging impact tube 16 downwardly further forces annular extension 54 into groove 84 in surfaces 80 and 82, respectively, and abuts the lower edge of arms 42 and 44 with stops 88. Clamping arms 68 and 72 are forcibly urged against surfaces 48 and 52 of transverse arms 42 and 44, respectively, and fixedly hold impact tube 16 in position. Upper portion 47 of body 24 is received in vertical groove 79 in bracket wall 66 for preventing any lateral movement of impact tube 16 when fixedly held in position. As seen best in FIGURE 2, transverse arms 42 and 44 are so positioned with respect to the longitudinal axis of body 24, that in clamp position, opening of bore 32 is properly positioned for receiving impact pressure during movement of the boat. Also, the angle that body 24 makes with respect to the direction of forward movement of the boat reduces fouling of the impact tube by seaweed and paper.

To remove impact tube 16 from the water, i.e., when the boat is beached or trailed, body portion 24 is raised in a direction as shown by the arrows 92 in FIGURE 1, whereby annular projection 54 is pivoted in bracket groove 84 and tapered lower portion of surfaces 48 and 52 of transverse arms 42 and 44 slide along the inner surfaces of clamps 68 and 72 and urge clamps 68 and 72 outwardly. The clockwise rotation of impact tube 16 is continued until tapered portion 56 of transverse arms 42 and 44 is abutting the upper portions of surfaces 80 and 82 and indicated at 94 in FIGURE 4. Tube 16 can be securely held in this position for any desired time.

To remove impact tube 16 entirely from bracket 18 the clockwise rotation of impact tube 16 is continued. Impact tube 16 is pivoted about the upper edge of tapered surface 56, which forces clamps 68 and 72 further outwardly by sliding action tapered lower surfaces of arms 42 and 44 which frees impact tube 16 from bracket 18 and clamps 68 and 72 return to their original position abutting stops 74 and 76, respectively.

Impact tube 16 may also be conveniently removed from bracket 18 when in its operative position by rotating tube 16 in a counter-clockwise direction, which surfaces 48 and 52 urge clamps 68 and 72, respectively, outwardly and an upward component of force frees transverse arms 42 and 44 from bracket 18. Thus, if boat 12 is moving rearwardly and impact tube 16 strikes an object, tube 16 is sprung out of bracket 18 without damage. It is easy to recover by action of tube 22.

During forward movement of the boat, when impact tube 16 hits driftwood or underwater obstruction of some kind, it pivots upwardly out of the way such as shown in the intermediate position in FIGURE 1 and automatically returns to operative position without further action from the boat operator.

Impact tube 16 returns to operative position after passing the obstruction by reason of clamps 68 and 72 continuously urging arms 42 and 44 counter-clockwise.

Advantageously, body portion 24 is tapered along its longitudinal edge facing the direction of forward movement of boat 12, so as to provide the least drag.

There is thus provided an impact tube of minimum size and silhouette which causes a minimum of drag passing through fluid. When it hits an obstruction of some type, impact tube 16 gives, and is displaced upwardly, and thereby reduces the destructive force to a minimum, and quickly returns to operative position automatically. Further, the impact tube is easily removed from the water, and locked in "up" position when desired, such as beaching or trailing, by merely clockwise rotating it in its bracket. It is also easily removed entirely from the boat by further clockwise movement within its bracket or counter clockwise movement. Since there is only one operative mounting position, the impact tube is always correctly positioned in the water so as to provide proper pressure impulses to the pressure gauge to give accurate readings.

While in the foregoing description there has been shown and described the preferred embodiment of this invention, it is to be understood that minor changes in details of construction, combination and arrangement of the parts will occur and be resorted to by those skilled in the art without departing from the spirit and scope of the invention as claimed.

What I claim is:

1. A marine speedometer having a gauge, a connecting tube attached to said gauge and an impact tube, said impact tube pivotally mounted in a bracket comprising an elongated body member having an upper end and a lower end and an opening in a longitudinal edge adjacent said lower end, means for mounting said connecting tube to said body member and in communication with said opening, a pair of transverse arms extending outwardly from opposite sides of said body member adjacent said upper end, each arm having a forward surface and a rearward surface, said forward surfaces being coplanar and facing the same direction as said opening in said body member and having an annular projection thereon, said projection being transverse to the longitudinal axis of said body member and intermediate of the upper and lower edges of said forward surface, the portion of said forward surfaces below said annular projection and said rearward surfaces being parallel and substantially transverse to the axis of said opening, the portion of said forward surfaces above said annular projection having a rearwardly directed taper, said bracket being adapted to be mounted on a boat and having a base and spaced apart arms extending transversely from said base, said arms being spaced apart substantially equal to the length of said transverse arms on said impact tube for receiving said tube arms therebetween, said base having a downwardly tapered surface with a transverse groove therein, said groove corresponding to said annular projection for pivotal movement therebetween and a flexible clamping member mounted on said bracket adjacent a respective bracket arm and spaced from said tapered surface of said base a distance less than the thickness of a respective tube arm and annular projection, whereby said clamping member yieldably urges the corresponding rearward surface of a transverse arm toward said tapered surface upon said annular projection being seated within said groove for holding said body member in operative position so that said impact tube pivots when striking an object in the water and returns automatically to its operative position.

2. A marine speedometer having a gauge and a connecting tube attached to said gauge and an impact tube pivotally mounted in a bracket, said impact tube having an elongated body member with an upper end and a lower end and an opening in a longitudinal edge adjacent said lower end, means for mounting said connecting tube to said body member and in communication with said opening, a transverse arm extending outwardly from said body member adjacent said upper end and having a forward surface and a rearward surface, said forward surface being coplanar and facing the same direction as said opening, a first portion of said forward and rearward surface being parallel and substantially transverse to the axis of said opening, said forward surface having pivoting means thereon, said bracket having a recess portion, with a surface tapering downwardly, said tapered surface being adapted to be juxtaposed with said first portion of said forward surface and having pivoting bearing surface for coacting with said pivoting means, and flexible clamping means mounted on said bracket and adapted to urge said rearward surface toward said tapered surface, whereby said impact member is pivotably displaced in said bracket in response to a force exerted thereon.

3. An impact tube for a marine speedometer, comprising an elongated body having an upper end and lower end, said lower end having an opening therein, a transverse arm extending outwardly from said body adjacent said upper end and having a forward and rearward surface, said forward surface facing the same direction as said opening and having a transverse annular projection extending therefrom, intermediate the upper and lower edges of said forward surface, the portion of said forward surface below said projection and said rearward surface being parallel and substantially transverse to the axis of said opening, the portion of said forward surface above said projection tapering rearwardly, and an arm mounted on said body and spaced from said opening, said arm being substantially parallel to the axis of said body.

4. An impact tube for use with a marine speedometer comprising an elongaed body member having an upper end and a lower end and a longitudinally extending first bore therein terminating adjacent the lower end, said lower end having a second bore at an angle to the axis of said body member and communicating with said first bore, said second bore opening outwardly through an edge of said body, a pair of transverse arms extending outwardly from opposite sides of said body member adjacent said upper end and having a forward surface and a rearward surface, said forward surfaces being coplanar and facing the same direction as said second bore, said forward and rearward surfaces being parallel and substantially transverse to the axis of said second bore.

5. An impact tube as in claim 4, and further including a pair of arms mounted on opposite sides of said body member and straddling said opening of said second bore for preventing fouling of said tube.

6. A bracket assembly for removably mounting an impact tube having outwardly extending arms for a marine speedometer comprising a base adapted to be mounted on a boat, a pair of spaced apart arms transversely extending from said base, said base having spaced apart downwardly tapering surfaces adjacent the inner surface of said arm for forming a vertical groove therebetween, said tapered surfaces having an aligned transverse groove therein, stop members projecting outwardly from each of said tapering surfaces a predetermined distance below a respective transverse groove and a spaced apart clamping member overlying a respective tapering surface, said clamping members being spaced from respective tapering surface a distance less than the width of arms of said impact tube to be clamped.

7. A bracket asssembly for pivotally and removably mounting an impact tube of a marine speedometer whereein the upper portion of said impact tube is formed with arms extending outwardly therefrom and said arms having bearing surfaces on opposite faces comprising a bracket formed with a recess portion, said recessed portion having a downwardly tapering surface, a stop member projecting outwardly from said tapering surface a predetermined distance below the upper edge thereof, and flexible clamping means mounted on said bracket and adapted to overlie said recessed portion, said clamping means being spaced from said tapering surface a distance less than the width of said arms of said impact tube.

References Cited in the file of this patent

UNITED STATES PATENTS

| | | |
|---|---|---|
| 1,869,974 | Masters | Aug. 2, 1932 |
| 2,756,593 | Russell et al. | July 31, 1956 |
| 3,003,354 | Wood | Oct. 10, 1961 |